(12) United States Patent
Pechatnikov et al.

(10) Patent No.: US 10,337,862 B2
(45) Date of Patent: Jul. 2, 2019

(54) DIGITAL MAPPING SYSTEM BASED ON CONTINUOUS SCANNING LINE OF SIGHT

(75) Inventors: Michael Pechatnikov, Tel Aviv (IL); Vadim Zlotnik, Beer Sheva (IL); Vadim Kosoy, Ashdod (IL)

(73) Assignee: RAFAEL ADVANCED DEFENSE SYSTEMS LTD., Haifa (IL)

( * ) Notice: Subject to any disclaimer, the term of this patent is extended or adjusted under 35 U.S.C. 154(b) by 767 days.

(21) Appl. No.: 11/607,511

(22) Filed: Nov. 30, 2006

(65) Prior Publication Data

US 2010/0277587 A1   Nov. 4, 2010

(51) Int. Cl.
| | | |
|---|---|---|
| G01C 11/02 | (2006.01) |
| H04N 5/232 | (2006.01) |
| G02B 27/64 | (2006.01) |
| G02B 26/08 | (2006.01) |
| H04N 13/221 | (2018.01) |
| G03B 15/00 | (2006.01) |

(52) U.S. Cl.
CPC ........ *G01C 11/025* (2013.01); *G02B 26/0816* (2013.01); *G02B 27/644* (2013.01); *H04N 5/23238* (2013.01); *H04N 13/221* (2018.05); *G03B 15/006* (2013.01)

(58) Field of Classification Search
None
See application file for complete search history.

(56) References Cited

U.S. PATENT DOCUMENTS

| | | | |
|---|---|---|---|
| 5,155,597 A | 10/1992 | Lareau et al. | |
| 5,323,228 A * | 6/1994 | Moody | 356/469 |
| 5,668,593 A * | 9/1997 | Lareau et al. | 348/146 |
| 5,692,062 A | 11/1997 | Lareau et al. | |
| 5,999,211 A | 12/1999 | Hedges et al. | |
| 6,130,705 A | 10/2000 | Lareau et al. | |
| 6,256,057 B1 | 7/2001 | Mathews et al. | |
| 6,414,294 B1 * | 7/2002 | Marshall et al. | 250/208.1 |
| 6,510,282 B1 | 1/2003 | Ruck et al. | |
| 6,720,987 B2 * | 4/2004 | Koyanagi et al. | 348/36 |
| 6,757,445 B1 * | 6/2004 | Knopp | 382/285 |
| 6,809,763 B1 | 10/2004 | Yoshida | |
| 6,888,570 B1 | 5/2005 | Yoshida | |
| 7,009,638 B2 | 3/2006 | Gruber et al. | |

(Continued)

FOREIGN PATENT DOCUMENTS

| | | |
|---|---|---|
| EP | 1313308 | 5/2003 |
| WO | WO 96/41480 | 12/1996 |

(Continued)

OTHER PUBLICATIONS

R.R.Real, "Concept of 3-D Map Display with Stereo-Orthophoto"; Applied Optics, vol. 11, No. 6, Jun. 1972, pp. 1427-1429.*
http://www.fastcamreplay.com/apps/fleximagers.htm.

*Primary Examiner* — Christopher G Findley
(74) *Attorney, Agent, or Firm* — Mark M. Friedman

(57) ABSTRACT

Apparatus for capturing images while in motion, including at least one CCD camera housed within an aircraft traveling along a flight path, for capturing aerial images of ground terrain, a motor for rotating an axis on which the at least one CCD camera is mounted, and for generating a sweeping back-and-forth motion for a field of view of the at least one CCD camera, the sweeping motion being transverse to the aircraft flight path, and an optical assembly connected to said at least one CCD camera.

9 Claims, 8 Drawing Sheets

(56) References Cited

U.S. PATENT DOCUMENTS

| | | | |
|---|---|---|---|
| 7,129,460 B1 | 10/2006 | Olson et al. | |
| 2001/0004298 A1* | 6/2001 | Kobayashi | 359/462 |
| 2003/0080923 A1* | 5/2003 | Suyama et al. | 345/6 |
| 2003/0090576 A1 | 5/2003 | Kubota et al. | |
| 2003/0185549 A1* | 10/2003 | Partynski et al. | 396/7 |
| 2004/0051960 A1 | 3/2004 | Mihara | |
| 2004/0131263 A1 | 7/2004 | Kawamoto et al. | |
| 2005/0004759 A1 | 1/2005 | Siegel | |
| 2005/0146608 A1 | 7/2005 | Yosida et al. | |
| 2005/0177307 A1 | 8/2005 | Greenfeld et al. | |
| 2005/0213181 A1 | 9/2005 | MacKinnon et al. | |
| 2005/0224695 A1 | 10/2005 | Mushika | |
| 2006/0226741 A1* | 10/2006 | Ogura et al. | 310/366 |
| 2006/0245046 A1* | 11/2006 | Bergeron et al. | 359/366 |
| 2007/0093945 A1 | 4/2007 | Grzywna et al. | |
| 2007/0115211 A1* | 5/2007 | Sun | 345/52 |
| 2007/0116118 A1 | 5/2007 | Kostrzewski et al. | |
| 2008/0050038 A1* | 2/2008 | Lakshamanan et al. | 382/284 |

FOREIGN PATENT DOCUMENTS

| | | |
|---|---|---|
| WO | WO 97/42659 | 11/1997 |
| WO | WO 02/090887 | 11/2002 |
| WO | WO2006/137071 | 12/2006 |

* cited by examiner

DIGITAL MAPPING SYSTEM BASED ON CONTINUOUS SCANNING LINE OF SIGHT

FIELD OF THE INVENTION

The field of the subject invention is mapping systems. The subject invention relates to cartography, in particular to digital mapping systems.

BACKGROUND OF THE INVENTION

Airborne camera assemblies for capturing aerial photos are used for commercial and military cartography applications, including reconnaissance, mapping and terrain model generation. Conventional assemblies suffer from three drawbacks. (i) They are very expensive, because they use accurate wide-angle lens cameras with large format CCDs for replicating analog film cameras, inertial navigation units and motion stabilizers. (ii) They are very large and heavy, because they use large lenses. (iii) Due to short optical focal lengths, they require flight paths with low cruising altitudes. As a result, they have limited capability to cover large areas in short amounts of time.

SUMMARY OF THE DESCRIPTION

The subject invention concerns automated orthophoto, digital terrain model, digital surface model and camera model derivation from aerial photographs of a ground area. The subject invention provides a camera assembly for airborne use which is inexpensive, small and lightweight. The camera assembly of the subject invention has many advantages over prior art assemblies.

Prior art systems use expensive large format CCDs. In distinction, the subject invention uses inexpensive commercially available small format interline CCDs. Since large format CCDs have low frame rates, using smaller CCDs with higher frame rates serves to acquire more total pixels per second. The subject invention generates a wide-angle sweep image from multiple frames, using a coherent photogrammetric camera model. Whereas small images are a drawback for prior art systems, the subject invention overcomes this drawback by using computer vision algorithms that solve and combine dozens of images into one sweep image with a coherent camera model.

The subject invention uses mirror-based folding lenses to reduce the size of an optical assembly and yet maintain required focal lengths. Mirror-based folding lenses are much smaller, lighter and less expensive than the large calibrated mapping lenses used with prior art systems. The optical assemblies with such lenses require only simple motors for rotation.

Prior art systems use mechanical shutters, which are not reliable and reduce the frame rate. Prior art systems also use polarizer shutters, which absorb significant light energy. In distinction, the subject invention uses a light-scattering liquid crystal shutter, which absorbs only negligible amounts of light and is able to operate for long periods of time in high frequencies. Moreover, use of scattering liquid crystal shutters in the present invention serves to overcome smear effects that are typically produced by interline CCD cameras.

Prior art motion compensation relies on stabilization of an entire sensing element, by mounting the sensing element on a stabilizer that maintains an absolute angle. In distinction, the subject invention uses gyroscopic sensors, GPS data and motor encoders for calculating motion compensation. Motion compensation is performed by tilting a mirror mounted on the folding optics, using a piezoelectric tilt platform. Since the total weight and size of the mirror are small, motion compensation is performed very accurately. The present invention compensates for forward motion, which is determined from GPS data, and also for angular sweeping motion, which is determined from gyroscopic sensors.

There is thus provided in accordance with an embodiment of the subject invention apparatus for capturing images while in motion, including at least one CCD camera housed within an aircraft traveling along a flight path, for capturing aerial images of ground terrain, a motor for rotating an axis on which the at least one CCD camera is mounted, and for generating a sweeping back-and-forth motion for a field of view of the at least one CCD camera, the sweeping motion being transverse to the aircraft flight path, and an optical assembly connected to said at least one CCD camera.

There is further provided in accordance with an embodiment of the subject invention a method for generating a camera model, including capturing a plurality of images of a scene as the line of sight of a camera sweeps across a scene, deriving a synthetic photogrammetric camera model from the plurality of images, and combining the plurality of images to derive a single continuous image, wherein the single continuous image is suitable for photogrammetric applications.

There is yet further provided in accordance with an embodiment of the subject invention a method for image compression, including receiving an image captured by a camera with a Bayer color CCD sensor at an original resolution, separating the captured image into 1 red, 1 blue and 2 green color channels, where each of the color channels has a resolution that is ¼ of the original resolution, and compressing each of the color channels using grayscale image compression.

BRIEF DESCRIPTION OF THE DRAWINGS

The subject invention will be more fully understood and appreciated from the following detailed description, taken in conjunction with the drawings in which.

DETAILED DESCRIPTION

The subject invention concerns mapping, in particular generation of accurate terrain maps from a large number of aerial color photos captured by one or more CCD cameras mounted within a moving aircraft. The cameras' fields of view sweep back and forth, generally transverse to the direction of flight, so as to cover a wide strip of terrain surrounding the path of flight.

Conventional photogrammetry uses either a "frame" camera model or a "push-broom" camera model. Generally, a camera model solution is a function that maps each pixel (i, j) in an image captured by a camera into a ray defined by 6 degrees of freedom emanating from the camera. The classical 6 degrees of freedom comprise (x, y, z, kappa, phi, theta), where x, y and z are scalars, and kappa, phi and theta are angles. The camera model solution is generally obtained by sensing the camera's position and angles, or by using aerial triangulation using ground control points (GCPs). Obtaining a camera model is essential for mapping applications, surveillance applications and photogrammetry, as in creation of stereoscopic pairs.

A frame camera model acquires full frames at a single time. The camera model for a full frame is defined by 6 degrees of freedom for an entire frame. A push-broom camera model is based on a scanning column. For each scan column 6 degrees of freedom are solved.

Each model has its relative advantages and disadvantages. The frame model is more stable than the push-broom model, but push-broom models are currently generating larger images per model. The larger images cover a wider area, and are thus more useful.

The present invention overcomes these disadvantages, and generates a large image with a singe accurate camera model. The present invention combines the advantages of push-broom cameras, namely, large images, with the advantages of frame cameras, namely, accuracy, and simple stable image model.

Figure 1:
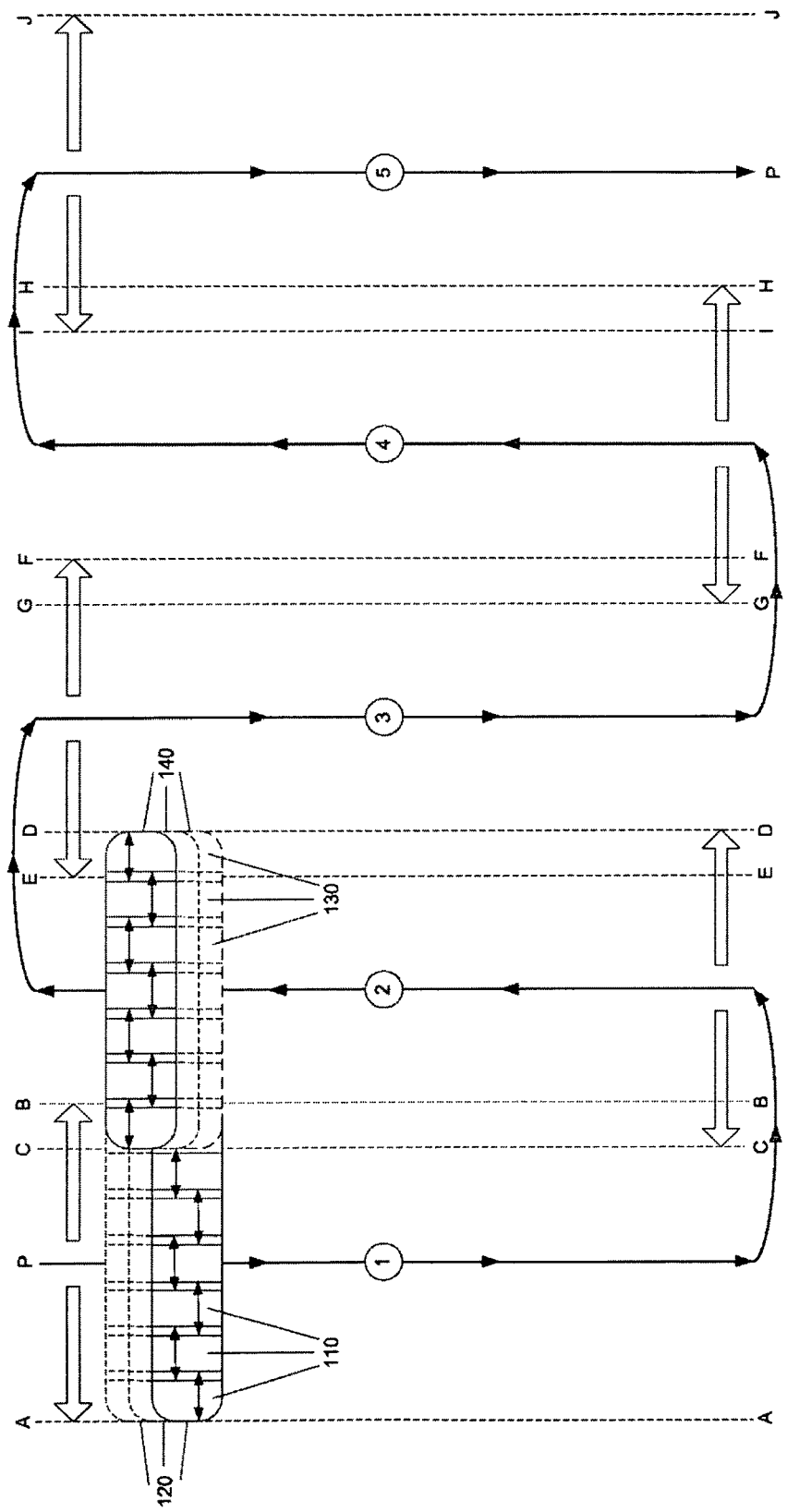
FIG. 1 is a simplified diagram of a typical flight path of an aircraft having one or more CCD cameras mounted therewithin and capturing aerial photos of the ground, in accordance with an embodiment of the subject invention.

Reference is now made to FIG. 1, which is a simplified diagram of a flight path of an aircraft having one or more CCD cameras mounted therewithin and capturing aerial photos of the ground, in accordance with an embodiment of the subject invention. As shown in FIG. 1, the flight path is designated by P and consists of multiple legs denoted 1-5, each leg being substantially along a straight line. The flight path is substantially at a constant cruise altitude.

As the craft proceeds along its flight path P on leg 1, the cameras mounted within the craft capture a series of ground photographs at overlapping fields of view 110 that are swept transverse to the direction of flight over sweeps 120. Each set of frames captured by the said cameras is called a strip. Sweeps 120 span the area indicated between lines A and B, and move forward along the flight path in time. Similarly, as the craft proceeds along its flight path P on leg 2, the cameras capture a series of ground photographs at overlapping fields of view 130 that are swept over sweeps 140. Strips 140 span the area indicated between lines C and D. Strips 140 overlap with strips 120, so as to ensure complete ground coverage and grabbing of stereoscopic image pairs. Typically, the overlap between legs may be over 50% in order to provide sufficient coverage for stereoscopic view purposes. On leg 3 the strips swept out by the cameras' fields of view span the area between lines E and F, on leg 4 they span the area between lines G and H, and on leg 5 they span the areas between lines I and J. The strip overlap areas are the areas between lines C and B, between lines E and D, between lines G and F, and between lines I and H. The process may continue for additional legs.

The extent of overlap between the individual fields of view 110 or 130 depends on their angles of view, and on the number of frames per second that the cameras can capture. As the frame rate is high, the speed of the aircraft is negligible. The extent of overlap between sweep 110 and the sequential sweep depends on the velocity of the aircraft. The extent of overlap between the sweeps 120 and 140 captured in adjacent legs depends on the distance between the various legs 1-5 and on the width of the sweeps swept out by the cameras' fields of view. The resolution of ground coverage depends on the focal lengths of the cameras and the resolutions of their CCD arrays.

In distinction from the prior art, the present invention combines the captured strips 110 to generate a large sweep image having a coherent camera model. That is, each sweep of the cameras is used to generate a single large sweep image with a coherent camera model. For each pixel (i,j) in the large sweep image, the camera model stores an index of the original frame that contains the pixel. For each original frame, the camera position and angles are known and stored with the frame image. As such, the synthetic camera model for the entire sweep image is as accurate as the individual frame models; i.e., the synthetic image does not add additional errors to the digital mapping process.

Figure 2:
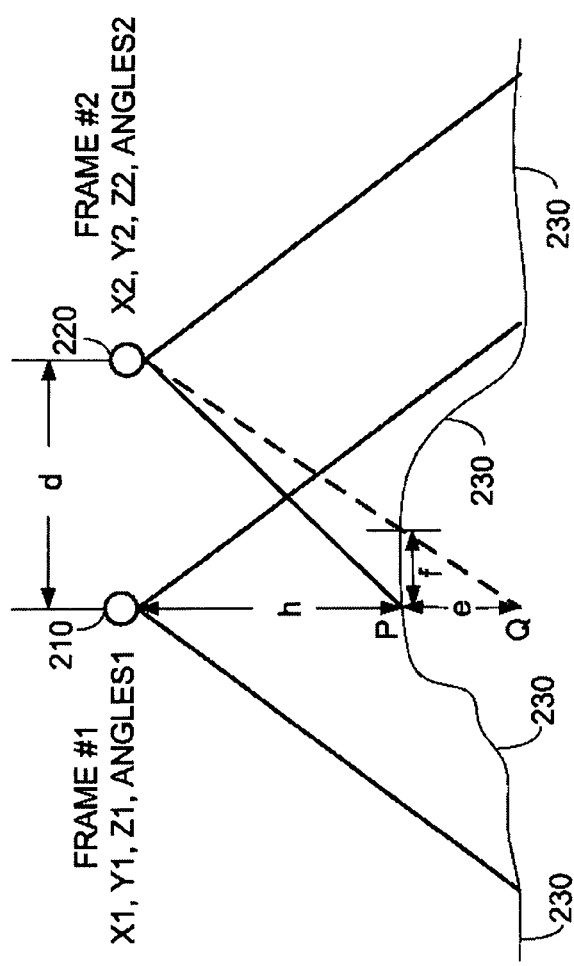
FIG. 2 is a simplified illustration of camera lines of sight, for determining accuracy of the synthetic model used by the present invention to combine frame images into a single coherent sweep image.

Reference is now made to FIG. 2, which is a simplified illustration of camera lines of sight, for determining accuracy of the synthetic model used by the present invention to combine frame images into a single coherent sweep image. Shown in FIG. 2 is camera at a first position 210 when capturing a frame #1 and at a second position 220 when capturing a frame #2. The line of sight for camera 210 is positioned and oriented according to parameters (x1, y1, z1, angles1), and the line of sight for camera 220 is positioned and oriented according to parameters (x2, y2, z2, angles2). The parameters angles1 and angles2 are used here to denote the three angular degrees of freedom, (kappa1, phi1, theta1) and (kappa2, phi2, theta2), respectively. The positional and angular parameters for the lines of sights are known from the camera model. The synthetic sweep model should be continuous and maintain the accuracy of the frame model for each pixel. The synthetic model assumes that the geometry along the stitch between two consecutive frames is maintained as a result of the similar perspective of frames #1 and frame #2. A DTM is used in order to create the stitch.

The curve denoted 230 represents a digital terrain model (DTM). As shown in FIG. 2, ground coordinates are determined by intersection of rays with the DTM. In particular, errors in the DTM contribute to errors in ground coordinate determination. Specifically, let e denote the extent of a DTM error as shown in FIG. 2. If the DTM is accurate, the panoramic projection of frames #1 and #2 is continuous. If the DTM is erroneous, the stitch line may not be continuous. As a result of this error, the camera model generates point P instead of point Q. By similar triangles, it can be seen that the deviation, denoted f in FIG. 2, satisfies $$f = d*e/(h+e), \quad (1)$$

where d is the displacement between positions 210 and 220. Since h is much larger than e, EQUATION 1 can be approximated by $$f \approx d*e/h. \quad (2)$$

To appreciate the implication of EQUATION 2, it is noted that under reasonable conditions the camera is moving at a velocity of 70 m/sec, the aircraft is at a height of h=3000 m, the image resolution of the camera corresponds to 10 cm/pixel, and the camera captures 7 frames/sec. As such, the displacement d=10 m, and an error f<0.1 m is within a single pixel. According to EQUATION 2, the DTM error, e, can be as large as e=f*h/d=30 m, without having an impact beyond 1 pixel. The present invention ensures that the displacement, d, between the camera positions at successive frame captures is small. According to EQUATION 2, this ensures that the threshold, e, for allowable DTM error is large. As such, the synthetic camera model for combining frames is insensitive even to large DTM errors, and results in a continuous sweep image.

Figure 3:
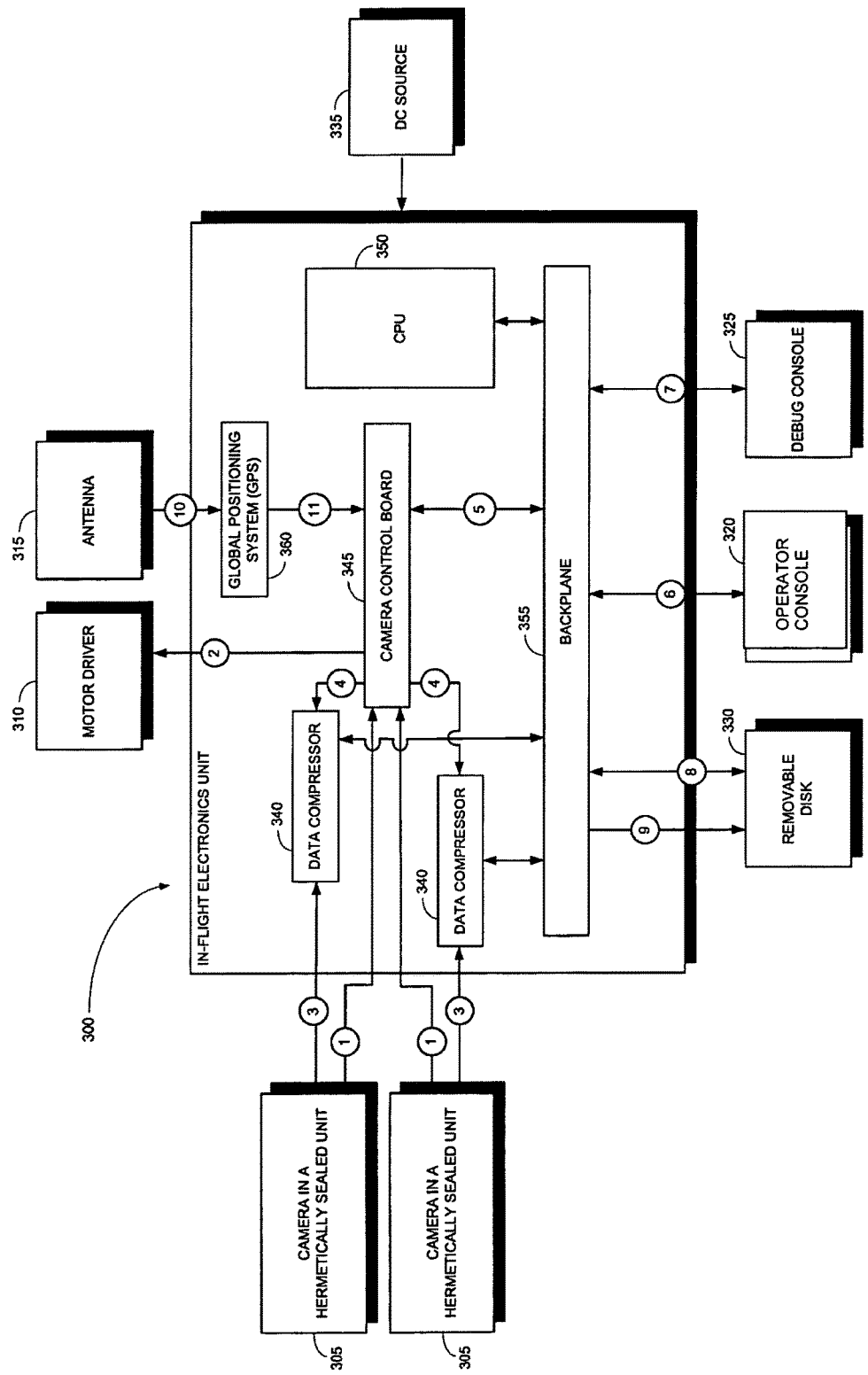
FIG. 3 is a simplified block diagram of an overall in-flight system on board the aircraft for capturing, processing and storing a multitude of aerial photos of the ground, in accordance with an embodiment of the subject invention.

Reference is now made to FIG. 3, which is a simplified block diagram of an overall in-flight system on board the aircraft for capturing, processing and storing a multitude of aerial photos of the ground, in accordance with an embodiment of the subject invention. The in-flight system is responsible for:

Image grabbing and compression;
Camera motor and motion compensation control;
Interface to removable storage; and
Power supply and voltage regulation.

Shown in FIG. 3 is an in-flight electronic unit 300 connected to two CCD cameras 305 which are housed in hermetically sealed units. CCD cameras 305 are temperature-controlled to prevent focal length variation at changing altitudes. Also connected to in-flight electronic unit 300 are a motor driver 310, an antenna 315, a navigation console 320, an operating console 325, a removable disk 330, and a DC power source 335. Navigation console 320 is used to guide the pilot in accurately navigating the legs of the flight path.

Orientation of CCD cameras 305 is performed by motor driver 310, which is controlled by a camera control board 345 housed inside in-flight electronic unit 300. Camera control board 345 receives feedback information from CCD cameras 305, and communicates with motor driver 310 in a feedback loop. The links 1 between CCD cameras 305 and camera control board 345 are camera control links that transmit DC, data, sync and analog signals. The links 2 between camera control board 345 and motor driver 310 transmit motor driver signals, typically 28 v DC.

CCD cameras 305 are each connected to a data compressor 340, housed inside in-flight electronic unit 300. Data compressors 340 processor image data captured by CCD cameras 305, as described in detail below with reference to FIG. 7. The camera links 3 between cameras 305 and data compressors 340 transmit camera signals, and typically include approximate 13 low-voltage differential signal (LVDS) pairs. Camera control board 345 is connected to each data compressor 340 by links 4, each link 4 being an internal trigger connection, and typically including 2 LVDS pairs.

Instruction processing in in-flight electronic unit 300 is performed by a CPU 350, which communicates with other system components through a backplane data bus 355. Data compressors 340, camera control board 345, navigation console 320, operating console 325 and removable disk 330 each communicate with CPU 350 using backplane 355. Camera control board 345 is connected to backplane 355 by link 5 using universal serial bus transmission. Navigation console 320 is connected to backplane 355 by link 6, which is a gigabit Ethernet connection. Operating console is connected to backplane 355 by link 7, which transmits analog VGA and USB signals. Removable disk 330 is connected to backplane 355 by link 8, which includes a hard disk interface, such as a serial advanced technology attachment (SATA) storage connector, and by link 9, which provides 12 v/5 v power to removable disk 330 from backplane 355.

The present invention has many advantages over prior art aerial data capture systems. These advantages include inter alia:

weight and size significantly less than prior art systems;
use of non-polarized liquid crystal shutters to eliminate smear effects in CCD imagery;
continuous scanning of the line of sight, as opposed to step scanning;
forward motion compensation is performed using a piezoelectric platform;
no need for precise inertial measurement unit; and
no need for entire sensor stabilization.

In accordance with an embodiment of the subject invention, the camera assembly includes optical elements, including inter alia a window, mirror, lens, shutter and filter;
a CCD sensor;
an image stabilization tilt platform;
a gyroscopic orientation sensor;
a sealed enclosure;
a desiccator; and
insulation and a heating unit for thermal management of a liquid crystal shutter.

Further in accordance with an embodiment of the subject invention, the sweep motion system includes a support structure;
a motor and transmission assembly;
encoder/limit switches; and
cable management.

Figure 4:
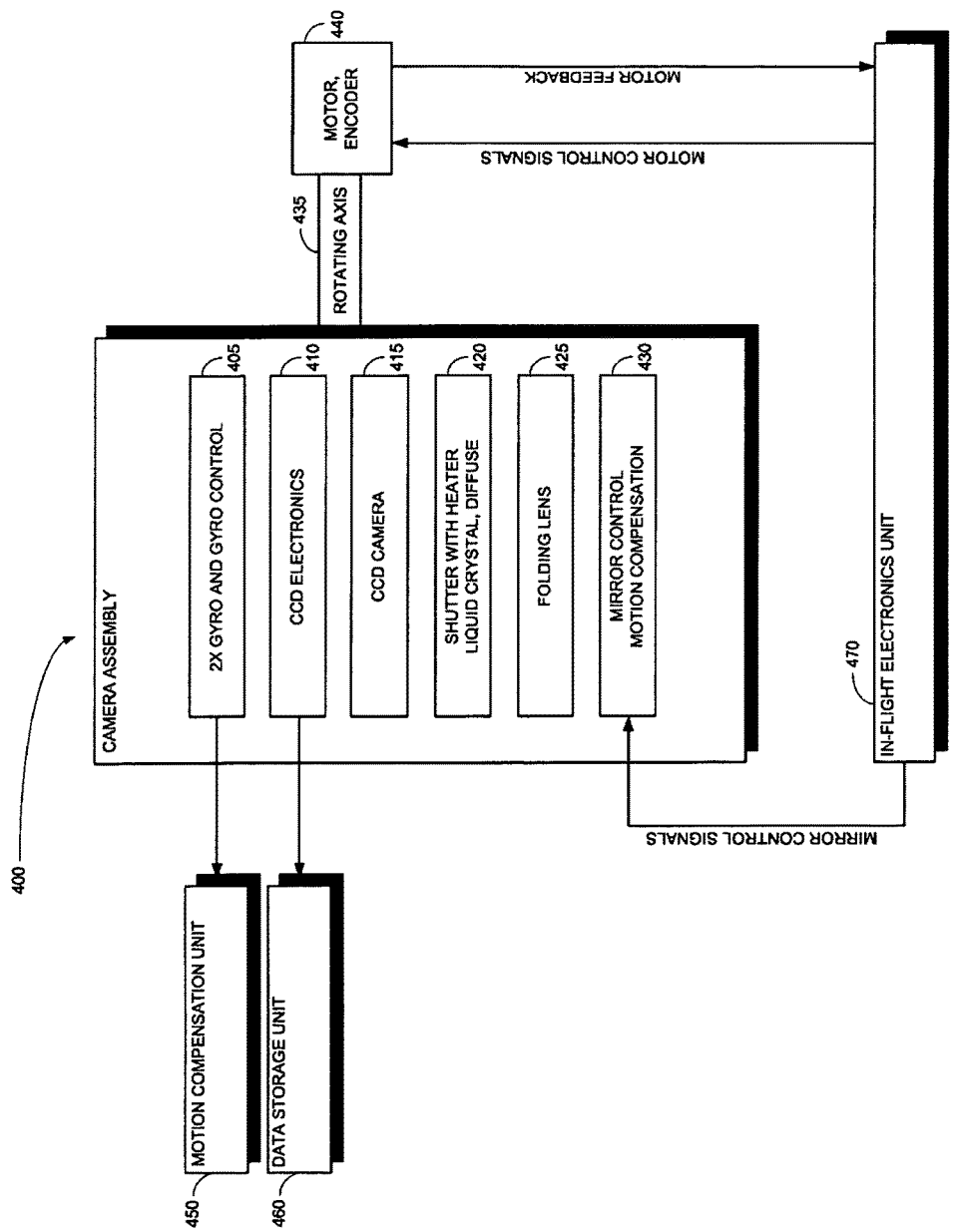
FIG. 4 is a simplified block diagram of the internal elements of the CCD cameras of FIG. 3, in accordance with an embodiment of the subject invention.

Reference is now made to FIG. 4, which is a simplified block diagram of the internal elements of CCD cameras 305, in accordance with an embodiment of the subject invention. As shown in FIG. 4, a camera assembly 400 includes a gyroscope and gyroscopic control unit 405, which sends gyroscopic orientation data to a motion compensation unit 450.

Camera assembly 400 also includes a CCD electronic unit 410 for processor CCD sensor array data, and a CCD camera 415. The sensor array data is passed from CCD electronics unit 410 to a data storage unit 360, for post-processing on the ground.

Camera assembly 400 also includes a shutter with an electric heater 420. In accordance with an embodiment of the subject invention, shutter 420 is a liquid crystal shutter; specifically, a polymer stabilized cholestoric textured (PSCT) liquid crystal optical light scattering shutter. In reducing the subject invention to practice, it has been found that light-scattering liquid crystal shutters absorb only negligible amounts of light. In distinction, conventional liquid crystal shutters based on polarizers absorb significant light energy.

Camera assembly 400 also includes a mirror-based folding lens 425. Use of a mirror-based folding lens serves to reduce the overall size of the optical assembly. Typically, lens 425 has a focal length of approximately 300 mm. In reducing the subject invention to practice, it has been found that this relatively large focal length yields good resolution when the aircraft is flying at high altitude, which makes the sensing of large areas more efficient.

Camera assembly 400 is fixed to a rotating axis 435, which is controlled by a motor/encoder 440. As axis 435 continuously rotates back and forth, the line of sight of the camera sweeps across strips transverse to the flight path, such as strip 120 illustrated in FIG. 1. Motor 440 receives control signals from an in-flight electronics unit 470, such as in-flight electronics unit 300, for controlling its rotation.

Figure 5:
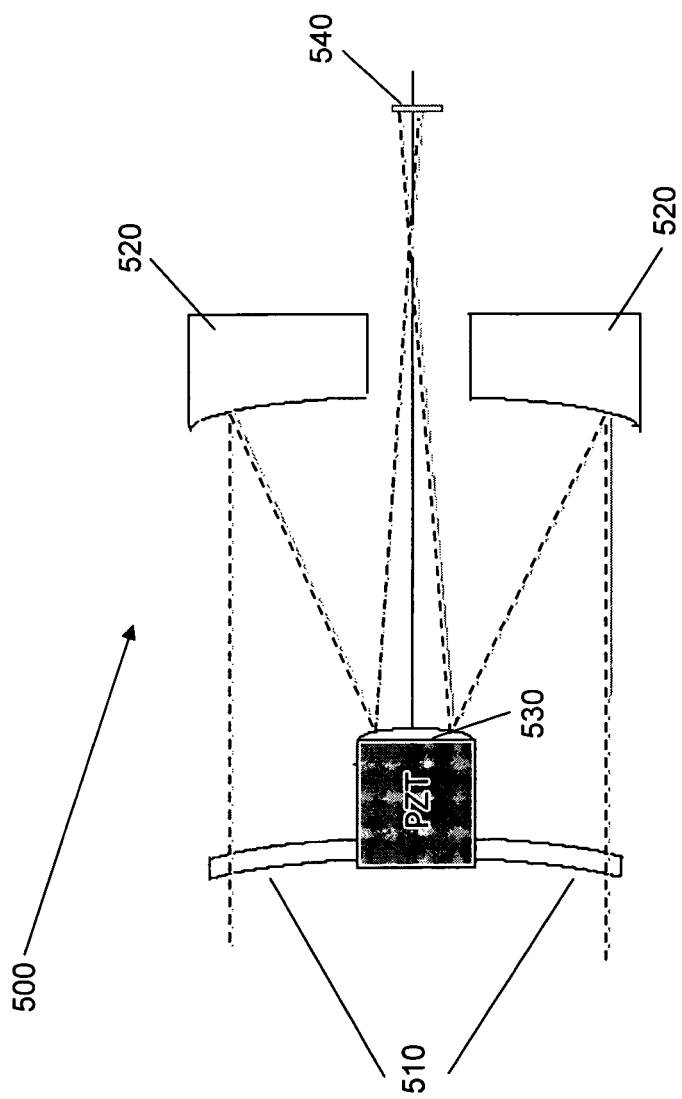
FIG. 5 is a cross-sectional view of an optical assembly with lens and mirrors, for the folding lens in FIG. 4, in accordance with an embodiment of the subject invention.

The line of sight of camera 415 is determined by the motor and by one or more mirrors within the optical assembly, as shown in FIG. 5 hereinbelow, whose positions are controlled by a mirror control compensation unit 430. Mirror compensation unit 430 receives control signals from in-flight electronics unit 470, and adjusts the positions of the mirrors so as to stabilize the line of sight.

Reference is now made to FIG. 5, which is cross-sectional view of an optical assembly 500 with lens and mirrors, for folding lens 425, in accordance with an embodiment of the subject invention. Light rays enter assembly 500 through a window 510, and are reflected through a series of two mirrors, mirror 520 and mirror 530, which directs them onto a lens 540.

Mirror 530 is accurately positioned by motion compensation controller 430. In accordance with the subject invention, the motion compensation is determined by processing gyroscopic sensor information, global positioning system (GPS) data, and information from motor encoder 440. The line of sight is stabilized by the mirror in order to compensate for continuous camera movement generated by the motor, and also to compensate for forward movement generated from the flight path of the aircraft. As such, the line of sight is stabilized in two dimensions. Mirror 530 is mounted on a piezoelectric tilt platform, and compensation is carried out by tilting the platform. Since the weight and size of mirror 530 is small, motion compensation is efficient and accurate.

The stabilized line of sight of the camera is determined by the angle of mirror 530. The mirror angle is changed while the CCD is exposed through a control loop. Specifically, the camera angle is monitored by gyro control unit 405. A control loop calculates the required mirror angle for maintaining the camera's line of sight. When a calculation indicates a required change in mirror angle, the control loop instructs the piezoelectric device to move the mirror, by applying appropriate voltage on each piezoelectric pole. The platform reacts to this voltage by moving the mirror, and the camera's line of sight is thereby maintained.

Figure 6:
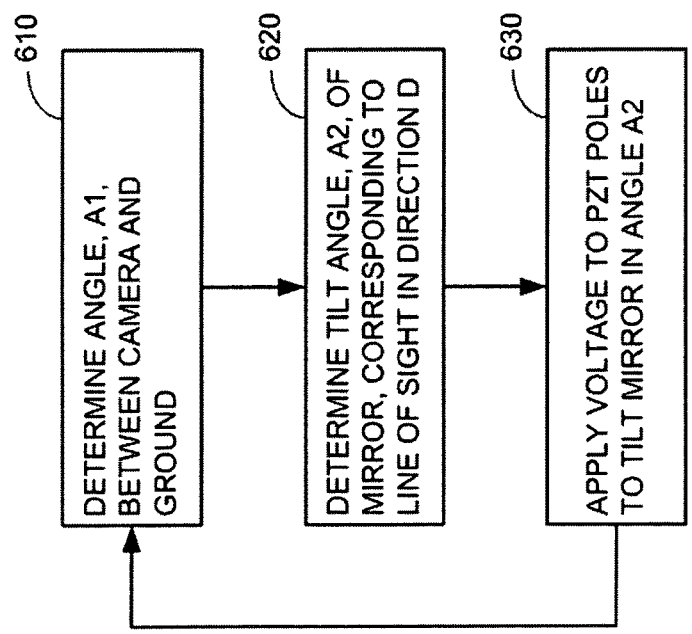
FIG. 6 is a simplified flowchart of a control loop that is used to stabilize a camera's line of sight, while the camera is in motion, in accordance with an embodiment of the subject invention.

Reference is now made to FIG. 6, which is a simplified flowchart of a control loop that is used to stabilize a camera's line of sight, while the camera is in motion, in accordance with an embodiment of the subject invention. At step 610 a dynamically changing angle, A1, between the camera and the ground, is determined by gyroscopic control unit 405. At step 620 an angle of tilt of the mirror, A2, is calculated so that the direction of the line of sight of the camera, as determined by angles A1 and A2, is in a specified target direction, D. At step 630 an appropriate voltage is applied to the piezoelectric platform, so that the mirror tilts in the calculated angle A2. Steps 610-630 form a control loop that compensates for the motion of the camera.

The color images captured by the CCD cameras are separated into three components, R, G, B, where R is a red component, B is a blue component, and G is a green component. Each color component is represented as 8 bits per pixel. Conventional compression codecs separate the images into three components Y, Cr, Cb, where Y is a luminance component, and Cr and Cb are chrominance components. Since luminance is generally the dominant visual component, the three components are sampled at 4:2:2 relative depths. As such, raw data of 24 bits per pixel is reduced to 16 bits per pixel.

Specifically for Bayer color CCDs, the density distribution of color elements often results in high frequency chroma data, which would lead to distortions if sub-sampling were not applied. Bayer CCDs are constructed from regular arrays of R, G and B filters, and captured images are separated into 4 mono-chromatic images; namely, 1 red image, 1 blue image and 2 green images. The mono-chromatic images are 8 bits per pixel, and they have ¼ the resolution of the input image. Compression of the mono-chromatic images often enhances Bayer images, since compression tends to reduce spurious high frequencies that arise from edges generated in Bayer images, which are especially noticeable in the luminance component of YCrCb images.

In an embodiment of the subject invention, JPEG 2000 compression is implemented using dedicated hardware with JPEG 2000 compression unit.

Figure 7:
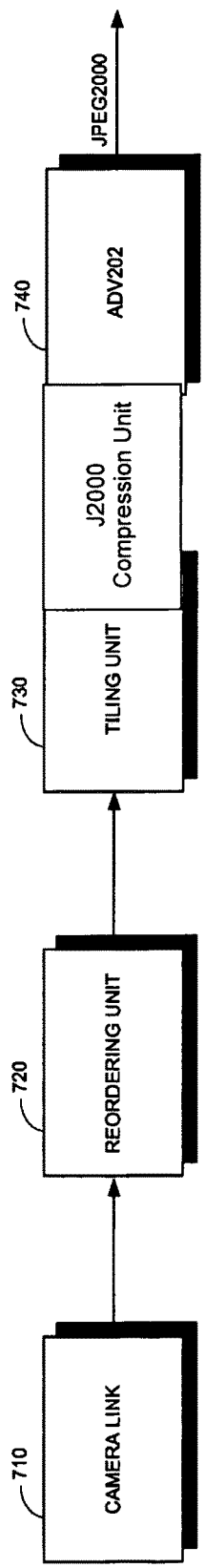
FIG. 7 is a simplified block diagram of the data compressors of FIG. 3, in accordance with an embodiment of the subject invention.

Reference is now made to FIG. 7, which is a simplified block diagram of data compressor 340, in accordance with an embodiment of the subject invention. Data compression is essential in order to use standard I/O data storage interfaces, such as data link 8 in FIG. 3. Otherwise, without compression, storing raw CCD images would exceed the capacity of convention SATA data busses.

Shown in FIG. 7 is a camera link 710, such as link 3 in FIG. 3, which transmits data to a re-ordering unit 720. Re-ordering unit 720 transmits the re-ordered data to a tiling unit 730, which in turn transmits the tiled data to an compression chip 740 for JPEG 2000 compression. Tiling unit 730 partitions a large image into smaller image blocks, thereby accelerating processing time.

Figure 8:
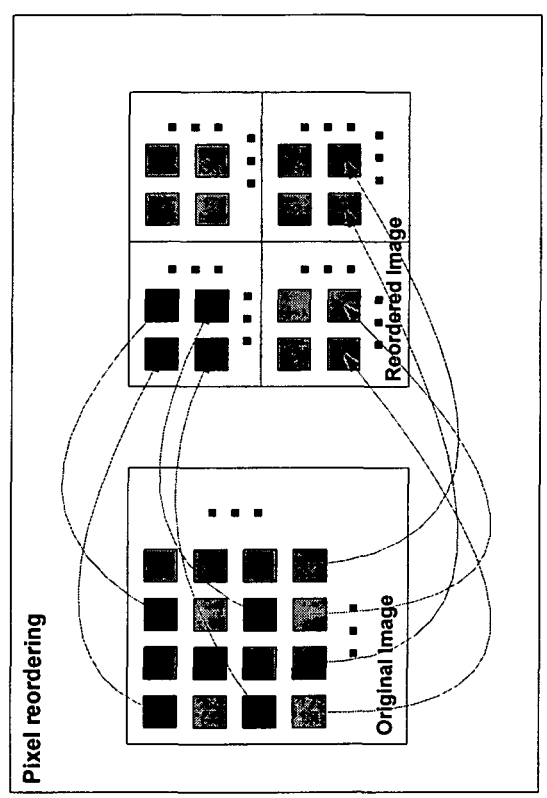
FIG. 8 is a simplified diagram illustrating how the re-ordering unit of FIG. 7 re-orders pixel color values, in accordance with an embodiment of the subject invention.

Reference is now made to FIG. 8, which is a simplified diagram illustrating how re-ordering unit 720 re-orders pixel color values, in accordance with an embodiment of the subject invention.

It will be appreciated by those skilled in the art that the subject invention has widespread application to terrain modeling for cartography, reconnaissance and 3-D flight simulation.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. Apparatus for capturing images while in motion, comprising:
    at least one camera having a digital sensor, housed within an aircraft defining a primary direction of flight, for capturing aerial images of ground terrain;
    a motor for rotating said at least one camera about an axis so as to generate a back-and-forth sweeping motion for a field of view of said at least one camera transverse to said axis;
    an optical assembly connected to said at least one camera, said optical assembly including a tilt-mirror assembly including a first mirror and an actuator associated with said first mirror for tilting said first mirror about at least one tilt-mirror axis; and
    a motion compensation controller associated with said tilt-mirror assembly and configured to actuate said tilt-mirror assembly such that, while said motor rotates said at least one camera smoothly and continuously to generate said sweeping motion of said field of view, said motion compensation controller actuates said actuator to tilt said first mirror about said at least one tilt-mirror axis synchronously with sampling of a plurality of images so as to cancel-out said sweeping motion of said field of view during each image exposure, thereby stabilizing a line of sight of said at least one camera for sampling of each image.

2. The apparatus of claim 1 wherein said optical assembly comprises a scattering liquid crystal shutter.

3. The apparatus of claim 1 wherein said optical assembly comprises a polarizer liquid crystal shutter.

4. The apparatus of claim 1, wherein said optical assembly also includes a second mirror, said first and second mirrors forming at least a portion of a mirror-based folding optical system.

5. The apparatus of claim 1, wherein said actuator tilts said first mirror so as to adjust a pivotal orientation of said first mirror about two orthogonal axes of rotation.

6. The apparatus of claim 5, wherein said motion compensation controller is further configured to actuate said tilt-mirror assembly so as to compensate for camera motion generated by forward motion of said aircraft along a flight path.

7. A method for capturing images while in motion, comprising:
   (a) providing an apparatus comprising:
      at least one camera having a digital sensor, housed within an aircraft defining a primary direction of flight, for capturing aerial images of ground terrain;
      a motor for rotating said at least one camera about an axis so as to generate a sweeping back-and-forth motion for a field of view of said at least one camera transverse to said axis;
      an optical assembly connected to said at least one camera, said optical assembly including a tilt-mirror assembly including a first mirror and an actuator associated with said first mirror for tilting said first mirror about at least one tilt-mirror axis; and
   (b) during flight of the aircraft, and while said motor rotates said at least one camera smoothly and continuously to generate said sweeping motion of said field of view, actuating said actuator to tilt said first mirror about said at least one tilt-mirror axis synchronously with sampling of a plurality of images so as to cancel-out said sweeping motion of said field of view during each image exposure, thereby stabilizing a line of sight of said at least one camera for sampling of each image.

8. The method of claim 7, wherein said actuator tilts said first mirror so as to adjust a pivotal orientation of said first mirror about two orthogonal axes of rotation.

9. The method of claim 8, wherein said actuating said actuator is performed so as to further compensate for camera motion generated by forward motion of said aircraft along a flight path.

* * * * *